United States Patent [19]

Leising

[11] Patent Number: 4,525,519

[45] Date of Patent: Jun. 25, 1985

[54] STABLE AMPHOTERIC LATICES OF COPOLYMERS BASED ON CONJUGATED DIENES

[75] Inventor: Frederic Leising, Vaujours, France

[73] Assignee: Rhone-Poulenc Specialites Chimiques, France

[21] Appl. No.: 573,726

[22] Filed: Jan. 25, 1984

[30] Foreign Application Priority Data

Jan. 28, 1983 [FR] France ................... 83 01302

[51] Int. Cl.³ .............................................. C08L 41/00
[52] U.S. Cl. ..................... 524/457; 524/828
[58] Field of Search .............. 524/457, 815, 814, 812, 524/828

[56] References Cited

U.S. PATENT DOCUMENTS

| | | | |
|---|---|---|---|
| 2,512,697 | 6/1950 | Grotenhuis | 524/457 |
| 2,746,943 | 5/1956 | Pritchard | 524/457 |
| 2,808,388 | 10/1957 | Hellmann | 524/457 |
| 2,965,594 | 12/1960 | Maeder et al. | 260/29.6 |
| 3,108,979 | 10/1963 | Le Fevre et al. | 260/29.6 |
| 3,253,941 | 5/1966 | Finn et al. | 427/155 |
| 3,399,159 | 8/1968 | Samour | 524/808 |
| 3,404,114 | 10/1968 | Snyder et al. | 260/29.6 |
| 3,635,867 | 1/1972 | Yuille | 524/457 |
| 4,017,440 | 4/1977 | Killam | 260/29.6 HN |
| 4,051,093 | 9/1977 | Wendel et al. | 260/29.6 TA |
| 4,064,091 | 12/1977 | Samour et al. | 260/29.6 HN |
| 4,111,922 | 9/1978 | Beede et al. | 526/292 |
| 4,337,185 | 6/1982 | Wessling et al. | 524/458 |
| 4,373,056 | 2/1983 | Besecke et al. | 524/547 |
| 4,403,065 | 9/1983 | Yoshioka et al. | 524/816 |
| 4,426,489 | 1/1984 | Wessling et al. | 524/815 |

Primary Examiner—Paul R. Michl
Assistant Examiner—N. Sarofim
Attorney, Agent, or Firm—Finnegan, Henderson, Farabow, Garrett & Dunner

[57] ABSTRACT

Stable amphoteric latices based on conjugated dienes formed by preparing an amphoteric aqueous dispersion of particles by reacting at least one unsaturated nitrogen compound capable of being hydrolyzed in an acid or alkaline medium with an aqueous emulsion reaction medium, containing cationic species, and polymerizing, in the aqueous dispersion, without prior neutralization of the dispersion, at least one conjugated diene or a mixture of conjugated dienes and at least one non-ionic monomer in the presence of an initiator selected from the group consisting of an uncharged initiator and a cationic-charge-generating initiator.

32 Claims, No Drawings

STABLE AMPHOTERIC LATICES OF COPOLYMERS BASED ON CONJUGATED DIENES

FIELD OF THE INVENTION

The present invention relates to stable amphoteric latices of copolymers based on conjugated dienes formed by polymerizing conjugated dienes and non-ionic monomers in an amphoteric aqueous dispersion of particles. A process for preparing the stable amphoteric latices of copolymers based on conjugated dienes is also disclosed.

BACKGROUND OF THE INVENTION

It is known in the art of emulsion polymerization that both cationic and amphoteric latices can be prepared in a highly acidic medium. U.S. Pat. No. 3,399,159 discloses a process for preparing cationic latices whereby a nitrogen-containing monomer, such as vinyl-pyridine or tertbutylaminoethyl methacrylate is polymerized, with an alkyl acrylic ester, in the absence of an emulsifier and in a medium with a pH of between 1 to 3.5, thereby forming an aqueous dispersion. A diene is then polymerized in the resultant aqueous dispersion.

It is also known that such latices can be prepared by neutralizing the initial polymerized product. U.S. Pat. No. 3,404,114 discloses the preparation of amphoteric latices by (1) polymerizing an unsaturated carboxylic acid and an unsaturated acid ester, (2) neutralizing the medium to a pH of approximately 7 with a nitrogen-containing neutralizing agent, and (3) polymerizing in the medium an alkylaminoalkyl ester of an unsaturated carboxylic acid.

Cationic and amphoteric latices prepared by emulsion polymerization have been increasingly used as binders in exterior and interior paints, as well as for foams and coatings, and thus simpler and more efficient processes for producing such latices have been attempted. It is therefore the object of the present invention to prepare stable amphoteric aqueous dispersions of copolymers based on conjugated dienes at any pH and without an intermediate neutralization step.

SUMMARY OF THE INVENTION

The present invention provides a process for making stable amphoteric latices of copolymers based on conjugated dienes comprising the steps of preparing an amphoteric aqueous dispersion of particles by reacting at least one unsaturated nitrogen compound capable of being hydrolyzed in an acid or alkaline medium with an aqueous emulsion reaction medium containing cationic species. The aqueous reaction medium includes at least one non-ionic monomer capable of being copolymerized with the unsaturated nitrogen compound and at least one substance which generates cationic species and which is capable of chemically binding with the synthetic polymers produced by the polymerization of the monomers. The reaction product of the first step is polymerized, in the aqueous dispersion, with at least one conjugated diene and, if appropriate, at least one non-ionic monomer, in the presence of an uncharged initiator or a cationic-charge-generating initiator.

The invention also includes stable amphoteric latices of copolymers based on conjugated dienes formed by preparing the amphoteric aqueous dispersion of particles and polymerizing, in the aqueous dispersion, at least one conjugated diene, and, if appropriate, at least one non-ionic monomer in the presence of an uncharged initiator or a cationic charge-generating-initiator.

DETAILED DESCRIPTION OF THE INVENTION

The invention as embodied herein provides a process for making stable amphoteric latices of copolymers based on conjugated dienes, comprising the steps of preparing an amphoteric aqueous dispersion of particles by reacting at least one unsaturated nitrogen compound capable of generating anionic charges by total or partial hydroylsis in a basic medium, with an aqueous emulsion reaction medium, containing cationic species. The aqueous emulsion reaction medium comprises a mixture of at least one non-ionic monomer capable of being copolymerized with the nitrogen compound and at least one substance which generates cationic species selected from the group consisting of a polymerization initiator which generates radicals with cationic ends, an unsaturated salt of a polycoordinated onium of a group Sa or Ga element capable of copolymerizing with the monomer, and suitable mixtures thereof. The amount of the substance which generates cationic species used corresponds to a ratio of the number of cationic charges generated by the substance to the number of anionic charges generated by the nitrogen compound in a basic medium of less than 1. The first step of the process is carried out up to at least about a 30% conversion for the non-ionic monomer. The second step of the process involves polymerizing, in the aqueous dispersion, without prior neutralization of the dispersion, at least one conjugated diene and at least one non-ionic monomer, in the presence of an initiator selected from the group consisting of an uncharged initiator and cationic-charge-generating initiator.

Any unsaturated nitrogen compound capable of generating anionic charges by total or partial hydrolysis in a basic medium may be used. A nitrogen compound is considered to be partially hydrolyzable if its degree of hydrolysis when polymerized in an acid or alkaline medium is at least about 10%. For example, those unsaturated nitrogen compounds having the followng general formula may be used as the nitrogen compound:

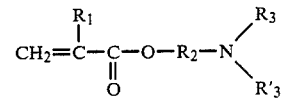

where $R_1$ is a hydrogen atom or a methyl group, $R_2$ is a methylene or ethylene group, $R_3$ is a hydrogen atom or a linear alkyl group with 1 to 4 carbon atoms, and $R'_3$ is a hydrogen atom or a linear alkyl group with 1 to 4 carbon atoms, or if $R_3$ is a hydrogen atom, a branched alkyl group with 3 or 4 carbon atoms, with the total number of carbon atoms in groups $R_2$, $R_3$ and $R'_3$ being less than or equal to 8, preferably less than or equal to 6.

Examples of nitrogen compounds which correspond to this formula are dimethylaminomethyl acrylate or methacrylate, dimethylaminoethyl acrylate or methacrylate, tert-butylaminomethyl acrylate or methacrylate and tert-butylaminoethyl acrylate or methacrylate.

Typical non-ionic monomers which are capable of being copolymerized with the nitrogen compound and which thus may be used in the claimed invention include vinylaromatic compounds such as styrene, α-methylstyrene, vinyltoluene, and monochlorostyrene;

vinyl esters such as vinyl acetate, vinyl propionate, vinyl versatate, and vinyl butyrate; ethylenic nitriles such as acrylonitrile and methacrylonitrile; ethylenic carboxylic acid esters such as methyl, ethyl, propyl, isopropyl, butyl, 2-ethylhexyl, hydroxyethyl, hydroxypropyl or glycidyl acrylate, and methyl, ethyl, propyl, butyl, hydroxyethyl, hydroxypropyl or glycidyl methacrylate; dialkyl esters of ethylenic dicarboxylic acids, such as dialkyl esters of fumaric acid, maleic acid, and itaconic acid; ethylenic amides and the N-substituted derivatives of ethylenic amides, such as acrylamide, methacrylamide, N-methylolacrylamide of N-methylolmethacrylamide, N-methoxymethylacrylamide and N-methoxymethylmethacrylamide.

The non-ionic monomer may be used individually, or, if they can be copolymerized with one another, as a mixture of two or more.

The substance which generates cationic species must be either non-hydrolyzable or partially hydrolyzable. A substance which generates cationic species is partially hydrolyzable if its hydrolysis degree is less than or equal to about 50% under the polymerization reaction conditions.

Examples of such substances include polymerization initiators which generate radicals with cationic ends, such as 2,2'-azobis(2-amidinopropane) hydrochloride and azobis-N,N'-dimethyleneisobutyramidine hydrochloride; unsaturated salts of a polycoordinated onium of a group 5a or 6a element (nitrogen, phosphorus, or sulfur) which are capable of being copolymerized with the monomer, and suitable mixtures thereof.

As defined herein, any salt with an onium cation, in which all the valences of the group 5a or 6a element are satisfied by hydrocarbon groups, at least one of which hydrocarbon groupings is unsaturated, and in which the free valency is saturated by a carbon atom is considered an unsaturated salt of a polycoordinated onium of a group 5a or 6a element.

Examples of such unsaturated salts are the quaternary ammonium salts having the following formula:

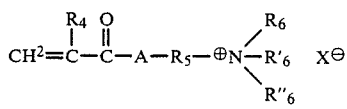

where $X^-$ is $Cl^-$, $Br^-$, $I^-$, $SO_4H^-$, $SO_4^{--}$, $CH_3SO_4^-$, $C_2H_5SO_4^-$ or $CH_3COO^-$, $R_4$ is a hydrogen atom or a methyl group, A is an oxygen atom or an $-NH-$ group, $R_5$ is a linear or branched alkylene group with 1 to 18 carbon atoms, preferably from 1 to 10 carbon atoms, and $R_6$, $R'_6$ and $R''_6$, which can be identical or different, are alkyl groups with 1 to 4 carbon atoms, optionally substituted by a hydroxyl radical, or a phenyl group optionally substituted by an alkyl radical with from 1 to 9 carbon atoms, with the total number of carbon atoms in the groups $R_5$, $R_6$, $R'_6$, and $R''_6$ being greater than 4 when A is oxygen.

Exemplary of such quaternary ammonium salts are trimethylaminoethylacrylamide chloride, trimethylaminopropylacrylamide bromide or trimethylaminopropylmethacrylamide bromide, trimethylaminobutylacrylamide methyl-sulfate and trimethylaminobutylmethacrylamide methyl-sulfate and trimethylaminopropyl methacrylate chloride.

In addition to quaternary ammonium salts, unsaturated salts or pyridinium, quinolinium, imidazolium, benzimidazolium, may be used as the substance which generates cationic species. Examples of such onium salts include 1-methyl 2-vinylpyridinium bromide, 1-ethyl-2-vinylpyridinium chloride, 1-ethyl-2-vinylpyridinium methyl-sulfate, 1-benzyl-4-vinylpyridinium chloride, 1-methyl-2-vinylquinolinium iodide, N-vinyl-N'-methylimidazolium bromide and 1-vinyl-3-methylbenzimidazolium bromide, (2-methacryloxy)-dimethylsulfonium chloride, methyldiallylsulfonium methyl-sulfate, and trimethylvinylphosphonium bromide.

Typical conjugated dienes which may be polymerized in the aqueous dispersion include butadiene, isoprene, chloroprene, penta-1,3-diene, dimethylbutadiene, and cyclopentadiene.

Those substances mentioned as examples of substances which generate cationic species may also be used in the present invention as cationic initiators.

Examples of non-ionic initiators which may be used in the claimed invention include: (1) water-soluble or organo-soluble, inorganic or organic peroxides and hydroperoxides which generate uncharged free radicals, such as hydrogen peroxide, benzoyl peroxide, tert.-butyl hydroperoxide, cumene hydoperoxide, tert-butyl perbenzoate, diisopropylbenzene peroxide, and methyl ethyl ketone peroxide; (2) the redox systems obtained by combining with said peroxides or hydroperoxides a reducing agent, such as ascorbic acid, sugars, polyvalent metal salts, the sulfites, dithionites, sulfoxalates, thiosulfates and bisulfites of sodium and calcium, and the formaldehydesulfoxylate of sodium or zinc; and (3) azoaliphatic compounds with an azoacyclic group and an aliphatic carbon atom for each nitrogen atom, wherein at least one of which carbon atoms is tertiary, such as azobisisobutyronitrile, 2,2'-azobis(2,4-dimethylvaleronitrile), 2,2'-azobis(2,4,4-trimethylvaleronitrile) and 2,2'-azobis(2,4-dimethyl-4-methoxyaleronitrile).

Examples of non-ionic emulsifiers which may be used include polyethoxylated fatty alcohols, polyethoxylated alcohol phenols, polyethoxylated fatty acids, and the like.

Exemplary of cationic emulsifying agents which may be employed in the claimed invention include: decylammonium methylsulfate, n-ethyldodecylammonium bromide, cetylammonium chloride, cetylammonium bromide, stearylammonium bromide, cetyldimethylbenzylammonium bromide, N,N-dimethyldodecylammonium chloride, N-methyltridecylammonium iodide, and the chlorides, bromides, sulfates, methylsulfates or acetates or ethoxylated fatty amines.

The nitrogen compound may be added to the reaction medium during any stage of the polymerization of the non-ionic monomer. For example, the nitrogen compound may be present in the reaction medium at the start of the polymerization of the non-ionic monomer, particularly if this polymerization is not to be complete. However, if polymerization is to be complete, it is advantageous to add the nitrogen compound continuously or discontinuously throughout the polymerization of the monomer. Similarly, the nitrogen compound may be added to the reaction medium after a certain degree of conversion of the monomer or monomers has occurred, for example after about 30% of the monomer has been converted to polymers or when about 90–98% of the monomer has been converted to polymers. Thus, the reaction medium can include both non-ionic monomers and polymerized non-ionic monomers.

The substance which generates cationic species can be added to the reaction medium before or simultaneously with the unsaturated nitrogen compound. The substance may also be present in the reaction medium at the start of the polymerization process in the form of a "cationic seed" that is, in the form of a polymer or copolymer, of the non-ionic monomer or monomers, prepared in a cationic medium, in the presence of the desired amount of the substance which generates cationic species.

The amount of nitrogen compound required in the first step of the process is about 1 to 20%, preferably about 1 to 10%, by weight of solid non-ionic monomer or monomers used.

The amount of substance which generates cationic species used in the claimed process depends on the hydrolysis level of both the nitrogen compound and the substance which generates cationic species. The molar ratio of the number of moles of the substance initially in the reaction medium plus the number of moles of the nitrogen compound to the number of moles of the non-ionic monomer initially in the reaction mixture is generally between about 0.1 and 15. For example, for a 90% degree of hydrolysis for the nitrogen compound and a 0% degree of hydrolysis for the substance which generates cationic species, the preferred molar ratio will be between about 1 and 15, preferably between about 1 and 10. For a 10% degree of hydrolysis for the nitrogen compound and a 0% degree of hydrolysis for the substance which generates cationic species, the molar ratio is preferably between about 0.1 and 1.5, most preferably between 0.2 and 1, while for a 90% degree of hydrolysis for the nitrogen compound and a 25% degree of hydrolysis for the substance, the molar ratio is preferably between 0.5 and 10, most preferably between 1 and 5.

The copolymerization of the nitrogen compound and the non-ionic monomer is carried out under conventional aqueous emulsion polymerization conditions in a cationic medium, at a temperature of between about 60° C. and 90° C., preferably between 75° and 85° C. in the presence of a cationic or non-ionic initiator or emulsifying agent. The medium may be at any pH from about 3 to about 12, most preferably from 5 to 9.

The amount of initiator used in the copolymerization process depends upon both the monomer used and the polymerization temperature and is generally about 0.1 to 5%, preferably about 0.1 to 2%, by weight, based on the total weight of the monomer. However, if the initiator is either the primary or one of the primary constituents of the substance which generates cationic species, a proportional amount of additional initiator must be used.

The amount of emulsifier used to stabilize the copolymer particles can be as much as about 2% of the total weight of the monomer.

The amount of diene is about 20 to 80% by weight, preferably from about 25 to 65% by weight, relative to the total weight of all monomers used both to prepare the aqueous dispersion and to polymerize, in the dispersion, the diene and the monomer.

The amount of non-ionic monomer polymerized with the conjugated diene can be as much as about 80% by weight of the total amount of the monomers used both to prepare the aqueous dispersion and to polymerize, in the dispersion, the diene and the non-ionic monomer.

The temperature and pH conditions of the polymerization of the conjugated diene are similar to those of the polymerization of the monomer to form the aqueous dispersion. A chain regulator and additional uncharged initiators or cationic-charge-generating initiators may be present.

Examples of such chain regulators are mercaptans, such as n-butylmercaptan, n-octylmercaptan, n-laurylmercaptan and t-dodecylmercaptan, and halogen derivatives, such as carbon tetrachloride, chloroform, trichlorobromomethane, and carbon tetrabromide.

The amphoteric latices of copolymers based on conjugated dienes of the claimed invention have a zeta potential which varies from about $+80$ mV to $-60$ mV, if the pH varies from about 2 to 12.

The amphoteric latices of the invention can be used as binders for coating paper, for the preparation of nonwoven sails, and for the coating of metallic substrates.

The exemplary substances of the constituents of the claimed latices and the following examples of the process for preparing the latices are illustrative and are not to be construed as limiting the invention delineated in the claims.

EXAMPLE 1

(A) Step 1

The following substances are charged cold into an autoclave with 5 liter capacity, and an anchor-type stirrer rotating at 180 rpm:

(1) 866 g of deionized water
(2) 7.5 g of cetyldimethylbenzylammonium bromide
(3) 15 g of trimethylaminopropylmethacrylamide chloride
(4) 15 g of diemthylaminoethyl acrylate The temperature of the autoclave is raised to 75° C. When the operating temperature is reached, 7.5 g of 2,2'-azobis(2-amidino-propane) hydrochloride and 50 g of deionized water are added simultaneously. 750 g of butyl acrylate, 660 g of styrene, and 60 g of dimethylaminoethylacrylate, are then added continuously at a constant rate over 5 hours.

10 minutes after the operating temperature is reached, the following substances are introduced continuously at a constant rate over 7 hours.

(1) 15 g of 2,2'-azobis(2-amidinopropane) hydrochloride
(2) 420 g of deionized water.

After a total operating time of 11 hours, the reaction is stopped by cooling.

The degree of conversion is 99%.

A dispersion with the following characteristics is obtained:

| pH | 7.5 |
|---|---|
| Amount of solids | 44% |
| Brookfield viscosity (50 rpm) | 191 mPa/s |
| Average particle diameter | 0.1μ |

The amphoteric character of the dispersion is demonstrated by measuring the zeta potential as a function of pH, using a MARK II microelectrophoresis intrument manufactured by RANK BROTHERS. The polymer concentration is 0.05%, the measurement voltage is 80 volts, and the temperature is 25° C.

The results of this measurement are as follows:

| pH | Zeta potential in mV |
|---|---|
| 4.5 | +55 |

-continued

| pH | Zeta potential in mV |
|---|---|
| 8.5 | −28 |

(B) Step 2

The following substances are charged cold into an autoclave with 5 liter capacity and a propeller-type stirrer rotating at 150 rpm:
(1) 900 g of deionized water,
(2) 170 g of the dispersion prepared in step 1.

The temperature of the autoclave is raised to 75° C. When the operating temperature is reached, the following substances are introduced over 5 hours at a constant rate:
(1) 555 g of styrene
(2) 855 g of butadiene
(3) 9.75 g of tert-dodecylmercaptan The following substances are then introduced continuously at a constant rate over 7 hours:
(1) 15 g of 2,2′-azobis(2-amidinopropane) hydrochloride and 375 g of deionized water.
(2) 15 g of nonylphenol oxyethyleneated with 30 units of ethylene oxide.

After an operating time of 12 hours, 30 minutes, the reaction is stopped by cooling.

A dispersion with the following characteristics is obtained:

| pH | 7.6 |
|---|---|
| Amount of solids | 42.9% |
| Brookfield viscosity (50 rpm) | 175 mPa/s |
| Average particle diameter | 0.24μ |

The zeta potential measurements are as follows:

| pH | Zeta potential in mV |
|---|---|
| 4.5 | +41 |
| 9 | −35 |

EXAMPLE 2

(A) Step 1

A 55 liter autoclave is charged with the following ingredients:
(1) 1,350 g of deionized water
(2) 20 g of cetyldimethylbenzylammonium bromide
(3) 15 g of trimethylaminopropylmethacrylamide chloride
(4) 15 g of dimethylaminomethyl acrylate
(5) 159 g of styrene
(6) 129 g of butyl acrylate The temperature of the autoclave is raised to 75° C. 15 g of 2,2′-azobis(2-amidinopropane) hydrochloride are then added.

(B) Step 2

After about 30 minutes, when the degree of conversion is about 90%, the following are added continuously at a constant rate over 5 hours:
(1) 901 g of styrene
(2) 731 g of butadiene
(3) 10 g of tert-dodecylmercaptan 10 g of 2,2′-azobis(2-amidinopropane) hydrochloride in 400 g of deionized water are then added continuously over 5 hours at a constant rate.

After a total operating time of 12 hours, 30 minutes, the reaction is stopped by cooling.

An amphoteric dispersion with the following characteristics is obtained:

| pH | 8.9 |
|---|---|
| Amount of solids | 43.4% |
| Brookfield viscosity (50 rpm) | 260 mPa/s |
| Average particle diameter | 0.22μ |

The zeta potential measurements are as follows:

| pH | Zeta potential in mV |
|---|---|
| 4.5 | +36 |
| 9.5 | −48 |

EXAMPLE 3

The process of Example 2 is repeated, but the degree of conversion, instead of being 90%, is limited to 50%, corresponding to a reaction time for step 1 of about 10 minutes.

The dispersion obtained has the following characteristics:

| pH | 8.7 |
|---|---|
| Amount of solids | 44.1% |
| Brookfield viscosity (50 rpm) | 198 mPa/s |
| Average particle diameter | 0.22μ |

The zeta potential measurements are as follows:

| pH | Zeta potential in mV |
|---|---|
| 4 | +49 |
| 8.2 | 0 |
| 9 | −31 |

EXAMPLE 4

Step 1

Step 1 of Example 1 is repeated, but the 15 g of trimethylaminopropylmethacrylamide chloride is replaced by 15 g of 1-methyl-2-vinylpyridinium chloride.

A dispersion with the following characteristics is obtained:

| pH | 7.8 |
|---|---|
| Amount of solids | 42.1% |
| Brookfield viscosity (50 rpm) | 181 mPa/s |
| Average particle diameter | 0.1μ |

Step 2

Step 2 of Example 1 is repeated with 178 g of latex prepared in step 1 of this example used as a cationic seed.

An aqueous dispersion with the following characteristics is obtained:

| pH | 8 |
|---|---|
| Amount of solids | 45.1% |

| | |
|---|---|
| Brookfield viscosity (50 rpm) | 116 mPa/s |
| Average particle diameter | 0.25μ |

The zeta potential measurements are as follows:

| pH | Zeta potential in mV |
|---|---|
| 4 | +48 |
| 8.05 | 0 |
| 9 | −22 |

EXAMPLE 5

Step 1

Step 1 of Example 1 is repeated, except that the 15 g+60 g additions of dimethylaminoethyl acrylate is replaced by 15 g+60 g additions of dimethylaminoethyl methacrylate.

A dispersion with the following characteristics is obtained:

| | |
|---|---|
| pH | 8 |
| Amount of solids | 45.1% |
| Brookfield viscosity (50 rpm) | 156 mPa/s |
| Average particle diameter | 0.1μ |

The zeta potential measurements are as follows:

| pH | Zeta potential in mV |
|---|---|
| 4.5 | +52 |
| 9 | −29 |

Step 2

Step 2 of Example 1 is repeated with 166 g of the dispersion prepared in step 1 of this Example used as the cationic seed.

An aqueous dispersion with the following characteristics is obtained:

| | |
|---|---|
| pH | 8.2 |
| Amount of solids | 45.6% |
| Brookfield viscosity (50 rpm) | 185 mPa/s |
| Average particle diameter | 0.25μ |

The zeta potential measurements are as follows:

| pH | Zeta potential in mV |
|---|---|
| 4.5 | +48 |
| 8.25 | 0 |
| 8.9 | −25 |

EXAMPLE 6

Step 1

Step 1 of Example 1 is repeated, but 1,410 g of butyl acrylate instead of 750 g of butyl acrylate +600 g of styrene are added continuously over 5 hours.

A dispersion with the following characteristics is obtained:

| | |
|---|---|
| pH | 7.8 |
| Amount of solids | 46.2% |
| Brookfield viscosity (50 rpm) | 241 mPa/s |
| Average particle diameter | 0.1μ |

The zeta potential measurements are as follows:

| pH | Zeta potential in mV |
|---|---|
| 4 | +58 |
| 8.5 | −26 |

Step 2

Step 2 of Example 2 is repeated. 162 g of the polybutyl acrylate dispersion prepared in step 1 of this Example is used as the cationic seed.

A aqueous dispersion with the following characteristics is obtained:

| | |
|---|---|
| pH | 8 |
| Amount of solids | 44.1% |
| Brookfield viscosity (50 rpm) | 172 mPa/s |
| Average particle diameter | 0.24μ |

The zeta potential measurements are as follows:

| pH | Zeta potential in mV |
|---|---|
| 4.5 | +50 |
| 7.9 | 0 |
| 9 | −36 |

EXAMPLE 7

Step 1

Step 1 of Example 1 is repeated, but 1,410 g of styrene, instead of 750 g of butyl acrylate +600 g of styrene, is added continuously over 5 hours.

A dispersion with the following characteristics is obtained:

| | |
|---|---|
| pH | 7.8 |
| Amount of solids | 45.8% |
| Brookfield viscosity (50 rpm) | 116 mPa/s |
| Average particle diameter | 0.1μ |

The zeta potential measurements are as follows:

| pH | Zeta potential in mV |
|---|---|
| 4 | +52 |
| 8.5 | −20 |

Step 2

Step 2 of Example 1 is repeated. 164 g of the polystyrene dispersion prepared in step 1 of Example 7 are used as the cationic seed.

An aqueous dispersion with the following characteristics is obtained:

| | |
|---|---|
| pH | 8.1 |
| Amount of solids | 43.2% |
| Brookfield viscosity (50 rpm) | 108 mPa/s |

| Average particle diameter | 0.24μ |
|---|---|

The zeta potential measurements are as follows:

| pH | Zeta potential in mV |
|---|---|
| 4.5 | +47 |
| 7.7 | 0 |
| 9 | −28 |

EXAMPLE 8

Step 1

An autoclave with 5 liter capacity is charged cold with the following ingredients:
(1) 866 g of deionized water
(2) 7.5 g of cetyldimethylbenzylammonium bromide
(3) 15 g of trimethylaminopropylmethacrylamide chloride The temperature of the autoclave is raised to 75° C. 7.5 g of 2,2'-azobis(2-amidinopropane) hydrochloride and 50 g of deionized water are added. The following are then added at a constant rate over 5 hours:
(1) 750 g of butyl acrylate
(2) 660 g of styrene The reaction is maintained at 75° C. for 4 hours, which corresponds to about a 90% degree of conversion. 75 g of dimethylaminoethylacrylate are then added over 1 hour.

After a total reaction time of 9 hours, the reaction is stopped by cooling.

A product with the following characteristics is obtained:

| pH | 8 |
|---|---|
| Amount of solids | 45.2% |
| Brookfield viscosity (50 rpm) | 216 mPa/s |
| Average particle diameter | 0.1μ |

The zeta potential measurements are as follows:

| pH | Zeta potential in mV |
|---|---|
| 4.5 | +62 mV |
| 9 | −33 mV |

Step 2

Step 2 of Example 1 is repeated. 166 g of the dispersion prepared in step 1 of this example is used as the cationic seed.

A dispersion with the following characteristics is obtained:

| pH | 8.2 |
|---|---|
| Amount of solids | 43.7% |
| Brookfield viscosity (50 rpm) | 205 mPa/s |
| Average particle diameter | 0.26μ |

The zeta potential measurements are as follows:

| pH | Zeta potential in mV |
|---|---|
| 4.5 | +51 mV |
| 7.8 | 0 |
| 9 | −23 mV |

EXAMPLE 9

Step 1

Step 1 of Example 1 is repeated.

Step 2

Step 2 of Example 1 is repeated, except the butadiene is replaced by 885 g of isoprene.

An aqueous dispersion with the following characteristics is obtained:

| pH | 8.1 |
|---|---|
| Amount of solids | 39% |
| Brookfield viscosity (50 rpm) | 88 mPa/s |
| Average particle diameter | 0.25μ |

The zeta potential measurements are as follows:

| pH | Zeta potential in mV |
|---|---|
| 4.5 | +39 |
| 8.4 | 0 |
| 9 | −19 |

EXAMPLE 10

Step 1

Step 1 of Example 2 is repeated, but the mixture of 159 g of styrene and 129 g of butyl acrylate is replaced by 288 g of butyl acrylate.

Step 2

Step 2 of Example 2 is repeated.

An aqueous dispersion with the following characteristics is obtained:

| pH | 8.5 |
|---|---|
| Amount of solids | 43.2% |
| Brookfield viscosity | 152 mPa/s |
| Average particle diameter | 0.25μ |

The zeta potential measurements are as follows:

| pH | Zeta potential in mV |
|---|---|
| 4.5 | +39 |
| 8.1 | 0 |
| 9 | −23 |

EXAMPLE 11

Step 1

Step 1 of Example 2 is repeated, but the mixture of 159 g of styrene and 129 g of butyl acrylate is replaced by 288 g of styrene.

Step 2

Step 2 of Example 2 is repeated.

An aqueous dispersion with the following characteristics is obtained:

| | |
|---|---|
| pH | 7.6 |
| Amount of solids | 43.1% |
| Brookfield viscosity (50 rpm) | 204 mPa/s |
| Average particle diameter | 0.24μ |

The zeta potential measurements are as follows:

| pH | Zeta potential in mV |
|---|---|
| 4.5 | +39 |
| 7.8 | 0 |
| 9 | −25 |

EXAMPLE 12

Step 1

Step 1 of Example 2 is repeated with a degree of conversion of 30% instead of 90%.

Step 2

Step 2 of Example 2 is repeated.

The aqueous dispersion with the following characteristics is obtained:

| | |
|---|---|
| pH | 8.0 |
| Amount of solids | 44.8% |
| Brookfield viscosity (50 rpm) | 48 mPa/s |
| Average particle diameter | 0.23μ |

The zeta potential measurements are as follows:

| pH | Zeta potential in mV |
|---|---|
| 4.5 | +41 |
| 8 | 0 |
| 9 | −30 |

EXAMPLE 13

Step 1

Step 1 of Example 1 is repeated.

Step 2

Step 2 of Example 1 is repeated except that the following ingredients are added at a constant rate over 5 hours:
(1) 720 g of styrene
(2) 555 g of butadiene
(3) 225 g of acrylonitrile
(4) 6.3 g of tert-dodecylmercaptan An aqueous dispersion with the following characteristics is obtained:

| | |
|---|---|
| pH | 8.1 |
| Amount of solids | 44.2% |
| Brookfield viscosity (50 rpm) | 152 mPa/s |
| Average particle diameter | 0.25μ |

The zeta potential measurements are as follows:

| pH | Zeta potential in mV |
|---|---|
| 4.5 | +51 |
| 7.3 | 0 |

| pH | Zeta potential in mV |
|---|---|
| 9 | −31 |

I claim:

1. A stable amphoteric latex based on conjugated dienes, formed by:
   (A) preparing an amphoteric aqueous dispersion of particles by reacting
      (a) at least one unsaturated nitrogen compound capable of being hydrolyzed in an acid or alkaline medium, with
      (b) a cationic aqueous emulsion mixture, containing:
         (i) at least one non-ionic monomer capable of being copolymerized with said hydrolyzable unsaturated nitrogen compound to form synthetic polymers,
         (ii) at least one unsaturated salt of a polycoordinated onium of a Group 5a or 6a element capable of copolymerizing with said monomers,
         (iii) a cationic or non-ionic polymerization initiator, and
         (iv) a cationic or non-ionic emulsifier,
   the amount of said unsaturated nitrogen compound being such that the ratio of the number of anionic charges generated by said unsaturated nitrogen compound in a basic medium to the number of cationic charges of the cationic aqueous emulsion mixture in a basic medium is more than 1, and
   (B) polymerizing, in said aqueous dispersion, without prior neutralization of said dispersion, at least one conjugated diene or a mixture of said conjugated diene and at least one non-ionic monomer in the presence of an initiator selected from the group consisting of an uncharged initiator and a cationic-charge-generating initiator.

2. The latex of claim 1, wherein the hydrolyzable unsaturated nitrogen compound has the formula:

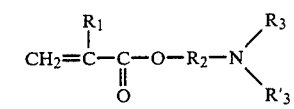

in which:
   $R_1$ is a hydrogen atom or a methyl group,
   $R_2$ is a methylene or ethylene group,
   $R_3$ is a hydrogen atom or a linear alkyl group with from 1 to 4 carbon atoms, and
   $R'_3$ is a hydrogen atom or a linear alkyl group with from 1 to 4 carbon atoms, or alternatively, a branched alkyl group with 3 to 4 carbon atoms if $R_3$ represents a hydrogen atom, the total number of carbon atoms present in the groups $R_2$, $R_3$ and $R'_3$ being less than or equal to 8.

3. The latex of claim 1, wherein the hydrolyzable unsaturated nitrogen compound is selected from the group consisting of dimethylaminoethyl acrylate, dimethylaminomethyl methacrylate, dimethylaminomethyl acrylate, dimethylaminoethyl methacrylate, tert-butylaminomethylamino acrylate, or dimethylaminoethyl methacrylate, tert-butylaminoethyl acrylate, and tert-butylaminoethyl methacrylate.

4. The latex of claim 1 wherein the non-ionic monomer or monomers copolymerizable with the unsaturated nitrogen compound is selected from the group consisting of vinyl aromatic compounds, vinyl esters, ethylenic nitriles, ethylenic carboxylic acid esters, dialkyl esters of ethylenic dicarboxylic acids, and ethylenic amides and the N-substituted derivatives of ethylenic amides.

5. The latex of claim 1, wherein said unsaturated salt of a polycoordinated onium is an unsaturated quaternary ammonium salt having the formula:

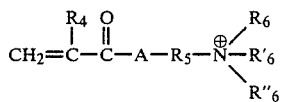

in which
X$^-$ is Cl$^-$, Br$^-$, I$^-$, SO$_4$H$^-$, SO$_4^{--}$, CH$_3$SO$_4^-$, C$_2$H$_5$SO$_4^-$ or CH$_3$COO$^-$,
R$_4$ is a hydrogen atom or a methyl group,
A is an oxygen atom or an —NH— group,
R$_5$ is a linear or branched alkylene group with 1 to 18 carbon atoms, preferably 1 to 10 carbon atoms,
R$_6$, R$'_6$, and R$''_6$, which may be identical or different, are alkyl groups with 1 to 4 carbon atoms, optionally substituted by a hydroxyl radical, or a phenyl group optionally substituted by an alkyl radical with 1 to 9 carbon atoms, and
the total number of carbon atoms present in the groups R$_5$, R$_6$, R$'_6$, and R$''_6$ being greater than 4 when A is oxygen.

6. The latex of claim 5, wherein the unsaturated quaternary ammonium salt is selected from the group consisting of trimethylaminoethylacrylamide chloride, trimethylaminoethylmethacrylamide chloride, trimethylaminopropylacrylamide bromide, trimethylaminopropylmethacrylamide bromide, trimethylaminobutylacrylamide methyl-sulfate, and trimethylaminopropyl methacrylate chloride.

7. The latex of claim 5, wherein said unsaturated salt of a polycoordinated onium is selected from the group consisting of unsaturated pyridinium, quinolinium, imidazolium, and benzimidazolium salts.

8. The latex of claim 5 wherein the amount of hydrolyzable unsaturated nitrogen compound corresponds to about 1 to 20% by weight, relative to the weight of non-ionic monomer.

9. A stable amphoteric latex of copolymers based on conjugated dienes, formed by:
(A) preparing an amphoteric aqueous dispersion of particles by reacting:
(a) at least one unsaturated nitrogen compound capable of generating anionic charges by total or partial hydrolysis in a basic or acidic medium, with
(b) a cationic aqueous emulsion mixture containing:
(i) at least one non-ionic monomer selected from the group consisting of vinyl aromatic compounds, vinyl esters, ethylenic nitriles, ethylenic carboxylic acid esters, dialkyl esters of ethylenic dicarboxylic acids, ethylenic amides, and N-substituted derivatives of ethylenic amides,
(ii) at least one unsaturated salt of a polycoordinated onium of a group 5A or 6a element capable of copolymerizing with said monomer, up to a degree of conversion of the non-ionic monomers of at least 30%,
(iii) a cationic or non-ionic polymerization initiator, and
(iv) a cationic or non-ionic emulsifier,
(B) polymerizing, in said aqueous dispersion, without prior neutralization of said dispersion, at least one conjugated diene selected from the group consisting of butadiene, iosprene, chloroprene, penta-1,3-diene, dimethylbutadiene, cyclopentadiene, and mixtures thereof with at least one non-ionic monomer, in the presence of an intiator selected from the group consisting of an uncharged initiator and a cationic-generating initiator.

10. A process for making stable amphoteric latices of copolymers based on conjugated dienes, comprising the steps of:
(A) preparing an amphoteric aqueous dispersion of particles by reacting:
(a) at least one unsaturated nitrogen compound capable of being hydrolyzed in an acid or alkaline medium, with
(b) a cationic aqueous emulsion mixture containing:
(i) at least one non-ionic monomer capable of being copolymerized with said hydrolyzable unsaturated nitrogen compound to form synthetic polymers,
(ii) at least one unsaturated salt of a polycoordinated onium of a Group 5a or 6a element capable of copolymerizing with said monomers,
(iii) a cationic or non-ionic polymerization initiator, and
(iv) a cationic or non-ionic emulsifier,
the amount of said unsaturated nitrogen compound being such that the ratio of the number of anionic charges generated by said unsaturated nitrogen compound in a basic medium to the number of cationic charges of the cationic aqueous emulsion mixture in a basic medium is more than 1, and
(B) polymerizing, in said aqueous dispersion, without prior neutralization of said dispersion, at least one conjugated diene or a mixture of said conjugated diene and at least one non-ionic monomer in the presence of an initiator selected from the group consisting of an uncharged initiator and a cationic-charge-generating initiator.

11. The process according to claim 10 wherein said unsaturated nitrogen compound is added to said cationic aqueous emulsion mixture during any stage of the polymerization of said non-ionic monomer.

12. The process according to claim 10 wherein said unsaturated salt of a polycoordinated onium is added to said cationic aqueous emulsion mixture before or simultaneously with said unsaturated nitrogen compound.

13. The process according to claim 10 wherein a cationic seed, comprising a polymer or copolymer prepared by aqueous emulsion polymerization, in a cationic medium, of said at least one non-ionic monomer in the presence of said unsaturated salt of a polycoordinated onium, is present in said cationic aqueous emulsion mixture at the start of the polymerization of said non-ionic monomer.

14. A process for making stable amphoteric latices of copolymers based on conjugated dienes, comprising the steps of:
(A) preparing an amphoteric aqueous dispersion of particles by reacting:

(a) at least one unsaturated nitrogen compound capable of generating anionic charges by total or partial hydrolysis in a basic medium, with (b) a cationic aqueous emulsion mixture, containing:

(i) at least one non-ionic monomer selected from the group consisting of vinyl aromatc compounds, vinyl esters, ethylenic nitriles, ethylenic carboxylic acid esters, dialkyl esters of ethylenic dicarboxylic acids, ethylenic amides, and N-substituted derivatives of ethylenic amides, and (ii) at least one unsaturated salt of a polycoordinated onium of a group 5a or 6a element capable of copolymerizing with said monomer, up to a degree of conversion of the non-ionic monomers of at least 30%, (iii) a cationic or non-ionic polymerization initiator, and (iv) a cationic or non-ionic emulsifier, the amount of said unsaturated nitrogen compound being such that the ratio of the number of anionic charges generated by said unsaturated nitrogen compound in a basic medium to the number of cationic charges of the cationic aqueous emulsion mixture in a basic medium is more than 1, and (B) polymerizing, in said aqueous dispersion, without prior neutralization of said dispersion, at least one conjugated diene selected from the group consisting of butadiene, isoprene, chloroprene, penta-1,3-diene, dimethylbutadiene, cyclopentadiene, and mixtures thereof with at least one non-ionic monomer in the presence of an initiator selected from the group consisting of an uncharged initiator and cationic-charge-generating initiator.

15. The process according to claim 14 wherein the ratio of (a) the number of moles of said unsaturated salt of a polycoordinated onium initially in the cationic aqueous emulsion mixture, plus (b) the number of moles of said unsaturated nitrogen compound provided, to (c) the number of moles of said non-ionic monomer initially in said cationic aqueous emulsion mixture is from 0.1 to 15.

16. The process according to claim 14 wherein said nitrogen compound is added to said cationic aqueous emulsion mixture during any stage of the polymerization of said non-ionic monomer.

17. The process according to claim 14 wherein said unsaturated salt is added to said mixture before or simultaneously with said nitrogen compound.

18. The process according to claim 14 wherein a cationic seed, comprising a polymer or copolymer prepared by aqueous emulsion polymerization, in a cationic medium, of said at least one non-ionic monomer in the presence of said unsaturated salt of a polycoordinated onium, is present in said cationic aqueous emulsion mixture at the start of the polymerization of said non-ionic monomer.

19. The process according to claim 14 wherein said unsaturated nitrogen compound has the formula:

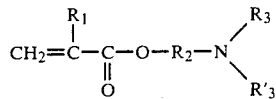

where $R_1$ is a hydrogen atom or a methyl group, $R_2$ is a methylene or ethylene group, $R_3$ is a hydrogen atom or a linear alkyl group with 1 to 4 carbon atoms, and $R'_3$ is either a hydrogen atom or a linear alkyl group with 1 to 4 carbon atoms or, if $R_3$ is a hydrogen atom, a branched alkyl group with 3 or 4 carbon atoms, wherein the total number of carbon atoms in groups $R_2$, $R_3$, and $R'_3$ is less than or equal to 8.

20. The process according to claim 19, wherein said unsaturated nitrogen compound is selected from the group consisting of dimethylaminomethyl acrylate or methacrylate, dimethylaminoethyl acrylate or methacrylate, tert-butylaminomethylamino acrylate or methyacrylate, and tert-butylaminoethyl acrylate or methacrylate.

21. The process according to claim 14 wherein said unsaturated salt of a polycoordinated onium is an unsaturated quaternary ammonium salt of the formula:

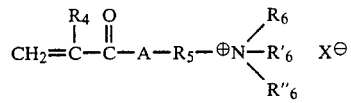

where $X^-$ is $Cl^-$, $Br^-$, $I^-$, $SO_4H^-$, $SO^{--}$, $CH_3SO_4^-$, $C_2H_5SO_4^-$, $CH_3COO^-$, $R_4$ is a hydrogen atom or a methyl group, A is an oxygen atom or an —NH— group, $R_5$ is a linear or branched alkylene group with from 1 to 18 carbon atoms, and $R_6$, $R'_6$, and $R''_6$, which may be identical or different, are either an alkyl group with from 1 to 4 carbon atoms, optionally substituted by a hydroxyl radical, or a phenyl group, optionally substituted by an alkyl radical with 1 to 9 carbon atoms, wherein the total number of carbon atoms in groups $R_5$, $R_6$, $R'_6$, and $R''_6$ is greater than 4 if A is oxygen.

22. The process according to claim 21 wherein said ammonium salt is selected from the group consisting of trimethylaminoethylacrylamide chloride, trimethylaminoethylmethacrylamide chloride, trimethylaminopropylacrylamide bromide, trimethylaminopropylmethacrylamide bromide, trimethylaminobutylacrylamide methyl-sulfate, trimethylaminobutylmethacrylamide methyl-sulfate, and trimethylaminopropyl methacrylate chloride.

23. The process according to claim 14 wherein said unsaturated salt of a polycoordinated onium is selected from the group consisting of unsaturated pyridinium, quinolinium, imidazolium, and benzimidazolium salts.

24. The process according to claim 14 wherein the amount of said unsaturated nitrogen compound corresponds to about 1 to 20% by weight of said non-ionic monomer.

25. The process according to claim 14 wherein the amount of said unsaturated nitrogen compound corresponds to about 1 to 10% by weight of said non-ionic monomer.

26. The process according to claim 14 wherein the polymerization temperature of said non-ionic monomer of said cationic aqueous emulsion mixture is between about 60° C. and 90° C., at any pH.

27. The process according to claim 14 wherein the amount of said conjugated diene corresponds to about 20 to 80% by total weight of all monomers used in both steps (A) and (B).

28. The process according to claim 14 wherein the amount of said conjugated diene corresponds to about 25 to 65% by total weight of all monomers used in both steps (A) and (B).

29. The process according to claim 14 wherein the amount of said non-ionic monomer polymerized with said conjugated diene corresponds to as much as 80% by total weight of all monomers used in both steps (A) and (B).

30. The process according to claim 14 wherein the polymerization temperature of said conjugated diene is between about 60° C. and 90° C., at any pH.

31. The process according to claim 14 wherein the polymerization temperature of said conjugated diene is between about 60° C. and 90° C., at any pH, in the presence of a chain regulator.

32. A process comprising use of said amphoteric latices of claim 10 as binders.

* * * * *